June 14, 1932.  W. J. ALBERSHEIM ET AL  1,863,090
METHOD AND MEANS FOR MEASURING THE VISCOSITY OF
LUBRICATING OILS AND OTHER LIQUIDS
Filed Nov. 23, 1927

INVENTOR
WALTER J. ALBERSHEIM
BY HARVEY S. KONHEIM

*Carl M. Cohen*
ATTORNEY

Patented June 14, 1932

1,863,090

UNITED STATES PATENT OFFICE

WALTER J. ALBERSHEIM AND HARVEY S. KONHEIM, OF NEW YORK, N. Y.

METHOD AND MEANS FOR MEASURING THE VISCOSITY OF LUBRICATING OILS AND OTHER LIQUIDS

Application filed November 23, 1927, Serial No. 235,170, and in Germany July 8, 1927.

Our prior Patent 1,604,672, October 26, 1926, concerns a method for measuring the viscosity of lubricating oils and other liquids, in which there is forced upon the liquid, while flowing through a conduit of known length and aperture, a constant amount, either of speed, or of pressure and in the first case the pressure drop determined by the degree of viscosity.

In another pending application filed by us, the velocity in a restricted portion of the conduit is measured.

In the first case, i. e. with the speed of flow being kept constant, the liquid, according to the main application flows before entering the restricted portion of the conduit, through a special arrangement consisting of revolving parts as turbines, propellers, capsules or cogwheels activated by the liquid for the purpose of keeping the velocity of flow constant.

The present invention aims at simplifying considerably by a new method the parts which maintain a constant speed of flow.

Figure 1:
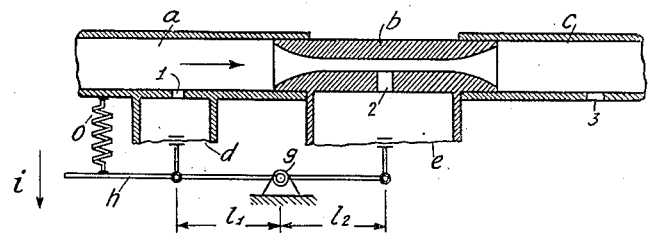
Figure 2:
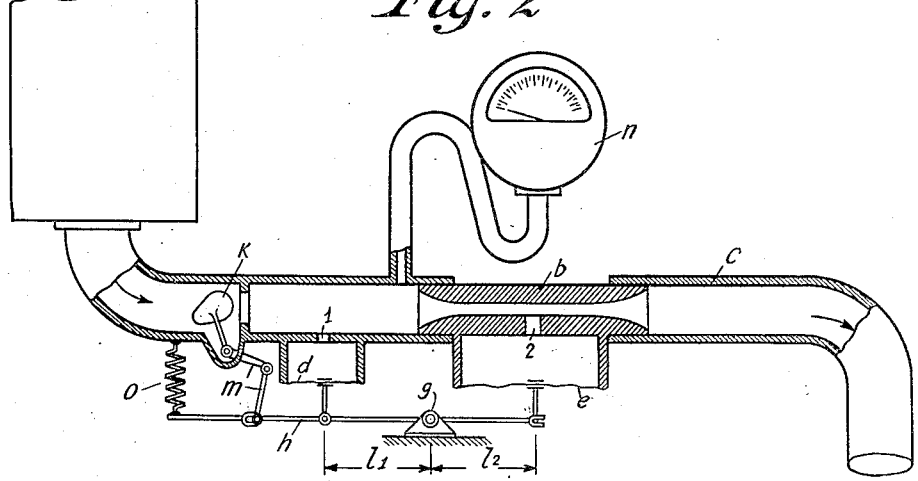
Figure 3:
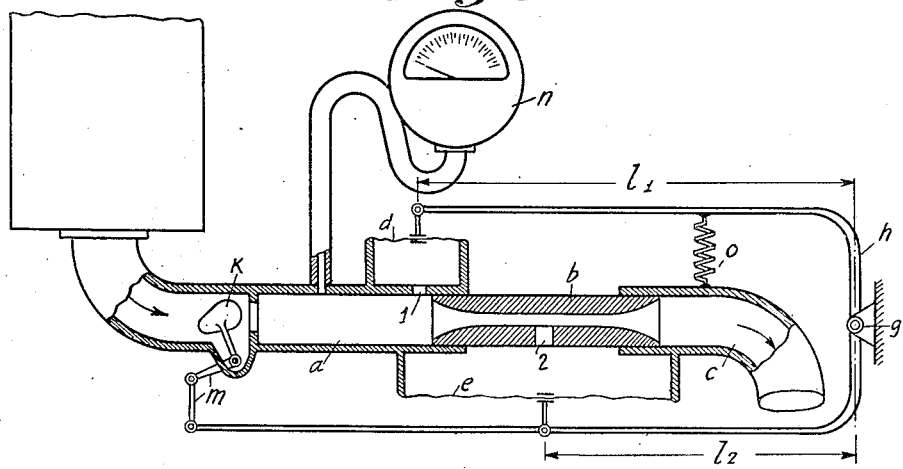

The manner in which this invention is carried out will be readily understood from the following description taken in connection with the accompanying drawing in which:

Fig. 1 is a diagrammatic view of apparatus used to explain the principles of this invention; and Figs. 2 and 3 are separate modifications of the invention.

The invention is based upon theoretical considerations and consists in keeping constant the speed of flow, instead of by revolving parts as turbines, propellers, capsules or cogwheels, by keeping constant the difference of pressure between predetermined portion $\frac{P_1}{k}$ of pressure $P_1$ in the conduit ahead of the restricted portion and the total pressure $P_2$ in the restricted portion. By the expression: "fixed portion $\frac{P_1}{k}$ of the pressure $P_1$", is meant a fraction of the pressure $P_1$ at a predetermined point.

For simplification's sake it shall be assumed hereafter, that the fixed portion $\frac{P_1}{k}$ of pressure $P_1$, have the value of the half pressure $\left(\frac{P_1}{2}\right)$ in other words the point is chosen where $k=2$. In the following there is derived, with the aid of Fig. 1, the equation, from which it becomes evident, that the velocity of the liquid is in direct proportion to the differential pressure $\frac{P_1}{2}-P_2$ between one half of the pressure $P_1$ in the conduit $a$ ahead of the restricted portion $b$ and the total pressure $P_2$ within the restricted portion $b$ and that it consequently will, if the pressure difference is kept constant, also retain constant value.

For deriving the formula, the following may be assumed:

According to Fig. 1 a liquid may flow through a passage of varying area (F) the passage may have control points at 1, 2, and 3. The areas at control points 1 and 3 be equal to one another, i. e. $F_1=F_3$. Then the velocity of flow at control points 1 and 3 are also equal, i. e. $V_1=V_3$.

The control point 2 is placed at the restricted portion $b$ of the conduit. According to the aquation of continuity, the velocity at control point 2 is (1) $\quad V_2 = V_1 \times \frac{F_1}{F_2}$ ($F_2$ being the area of the passage at point 2.)

If the liquid is nonviscous, the pressure at the control points is (2) $\quad P_3 = P_1, \text{ or } P_1 - P_3 = 0$ According to Torricelli the pressure difference $P_1 - P_2$ is (3) $\quad P_1 - P_2 = \frac{g}{2} \times (V_2^2 - V_1^2) = \frac{g}{2} \times V_1^2 \times \frac{F_1^2 - F_2^2}{F_2^2}$ In this formula $g$ symbolizes the specific gravity of the liquid, the small variation of which may be neglected in the formulas for measuring viscosity.

If the liquid is viscous, Equations (2) and (3) are modified by the pressure drop due to friction. There will be (4) $\quad P_1 - P_3 = n \times V_1 \times C_{1,3}$ and (5) $\quad P_1 - P_2 = \dfrac{g}{2} \times (V_2^2 - V_1^2) + n \times V_1 \times C_{1,2}$ In these formulas $n$ symbolizes the absolute viscosity of the liquid, $C_{1,2}$ and $C_{1,3}$ represent constants for the conduit portions from control points 1 to 2 and 1 to 3 respectively (for nonturbulent flow), which are determined by the mechanical shape of the respective portions of the conduit.

If equal friction is provided for in the conduit portions 1 to 2 respectively 2 to 3, one may substitute (6) $\quad C_{1,3} = 2C_{1,2} = 2C_{2,3}$.

Equation (4) is derived as follows:

By assumption, the conduit has equal diameters at the points 1 and 3. Therefore, there is no pressure difference through hydrodynamic acceleration energy.

Also, as shown in the drawing, intake and outlet of the restricted passage "b" are well rounded and tapered, with the result that there will be no turbulence of flow, and all the pressure difference is due to viscous friction.

The formula for the pressure loss in a cylindrical passage of constant radius has been derived and is as follows: (Poiselle's law)

(4a) $\quad \Delta p = \dfrac{8}{\pi} \dfrac{qln}{r^4} = \dfrac{8\pi qln}{F^2}$ where $n$ = viscosity
$l$ = length of passage
$r$ = radius of passage
$F$ = area
$q$ = quantity of flow For a variable area $F$, we can substitute (4b) $\quad \Delta p = 8\pi q n \displaystyle\int_{l=0}^{l_3} \dfrac{dl}{F_1^2}$ (4c) $\quad = 8\pi F_1 \cdot V_1 \cdot n \displaystyle\int_{l=0}^{l_3} \dfrac{dl}{F_1^2}$ where $V$ represents speed of flow.

From equation 4c it is seen that the pressure is determined by the velocity ($V$), the viscosity $n$, and the factor $$8\pi F_1 \int_{l=0}^{l_3} \frac{dl}{F_1^2}$$

Also, it will be clear that the expression last mentioned, which includes as variables only the area and length of the conduit, is in reality a function only of the mechanical configuration of the apparatus. This factor has been called the "friction constant", or in other words is the friction constant between points 1 and 3.

Similarly, constant $C_{1,2}$ is found to be:

$$8\pi F_1 \int_{l_1}^{l_2} \frac{dl}{F_1^2}$$

and constant $C_{2,3}$ is found to be:

$$8\pi F_1 \int_{l_2}^{l_3} \frac{dl}{F_1^2}$$

Substituting $C_{1,3}$ in Equation 4c we have:

(4) $\quad \Delta p = n \times V_1 \times C_{1,3} = P_1 - P_3$

Taking one half of Equation (4) and subtracting it from Equation (5) we find:

$$\begin{aligned} P_1 - P_2 &= \tfrac{g}{2}(V_2^2 - V_1^2) - nV_1 \times C_{1,2} \\ -\left(\tfrac{P_1}{2} - \tfrac{P_3}{2}\right) &= -\tfrac{(-nV_1 C_{1,3})}{2} \end{aligned}$$

$$\overline{\dfrac{P_1}{2} + \dfrac{P_3}{2} - P_2 = \dfrac{g}{2}(V_2^2 - V_1^2) - nV_1\left(C_{1,2} - \dfrac{C_{1,3}}{2}\right)}$$

since by (6) $\quad C_{1,2} - \dfrac{C_{1,3}}{2} = 0$ (7) $\quad \dfrac{P_1 + P_3}{2} - P_2 = \dfrac{g}{2}(V_2^2 - V_1^2)$ Since the part C of the conduit, containing control point 3, is located at the end of the conduit, we have (8) $\quad P_3 = 0$ This value, entered into Equation (4), makes (9) $\quad P_1 = n \times V_1 \times C_{1,3}$ Since from Equation (8) $P_3 = 0$ we can write Equation (7) as $$\dfrac{P_1}{2} - P_2 = \dfrac{g}{2}(V_2^2 - V_1^2)$$

and since $$V_2^2 - V_1^2 = V_1^2 \dfrac{(F_1^2 - F_2^2)}{F_1^2}$$

It therefore follows that:

(10) $\quad \dfrac{P_1}{2} - P_2 = \dfrac{g}{2} \times (V_2^2 - V_1^2) = \dfrac{g}{2} \times \dfrac{F_1^2 - F_2^2}{F_2^2} \times V_1^2$ From this Equation (10) it is evident that the pressure difference $$\dfrac{P_1}{2} - P_2$$

is not any more conditioned upon viscosity but only by the velocity of flow. It follows immediately, that the speed of flow will be maintained constant, if the pressure difference $\dfrac{P_1}{2} - P_2$ keeps its fixed value.

Accordingly, in order to keep the speed of flow constant, the pressure difference $\frac{P_1}{2} - P_2$ must be kept constant, as described in the following paragraphs.

The measurement of the pressure difference $$\frac{P_1}{2} - P_2$$

is achieved by two pistons or membranes $d$ and $e$ connected to the measuring points 1 and 2, having a square area $f_1$ and $f_2$ respectively and acting upon a twosided lever pivoting around central point $g$ in a fixed lever ratio $l_1 : l_2$, which will be explained presently. If, for example, the sizes of the membrane areas $f_1$ and $f_2$, and the active leverages $l_1$ and $l_2$ are chosen in such a mutual proportion, that the relation

(11) $\quad f_1 \times l_1 = \frac{l}{2} f_2 \times l_2$ is maintained, the torque (turning movement) exercised upon the lever $h$ in the direction of the arrow $i$ is proportional to the pressure difference $\frac{P_1}{2} - P_2$ From Equation 11 the torque is expressed by

(12) $\quad P_1 f_1 l_1 - P_2 f_2 l_2$

Accordingly, we have

(13) $\quad P_1 f_1 l_1 - P_2 f_2 l_2$ (proportional to) $\frac{P_1}{2} - P_2$

From Equation (13) it follows, that the torque acting upon the lever $h$ in the direction of the arrow $i$ will be larger, as the pressure difference $$\frac{P_1}{2} - P_2$$

increases and vice versa. The deflection at the end of the lever, accordingly, is always in direct proportion to the increases and decreases of this pressure difference.

This control of the deflection at the end of the lever $h$ by the said pressure difference is used, according to the invention herein stated, to maintain the constancy of flow. To this end, as shown in Fig. 2, a shutting off means (valve) $k$ positioned in the portion $a$ of the conduit is, by means of a link $m$ or equivalent means, connected to lever $h$ in such a way that the shutting off means diminishes the aperture, as the pressure difference tends to increase and increases it, as the pressure difference tends to fall off. The shutting off means is so constructed, that it over-compensates. That is, the variations of aperture in both ways are so great, that the pressure difference $$\frac{P_1}{2} - P_2$$

is always kept constant at an average value. According to Equation (10) maintenance of this constant pressure difference means maintenance of constant velocity in portion $a$ of the conduit as well.

By the above described contrivance, the maintenance of constant flow velocity in portion $a$ of the conduit called for by the main application may be achieved in a simple manner. The viscosity is measured, as in the main application, by a manometer $n$ calibrated in viscosity units and connected to portion $a$ of the conduit, just ahead of the restricted portion $b$. For, as according to Equation (9) we have $$P_1 - n V_1 C_{1,3},$$

the pressure

(14) $P_1$ will be proportional to $n$, if the speed of flow $V_1$ is kept constant, as described above.

Accordingly, by measuring the pressure $P_1$ at measuring point 1 in the portion $a$ of the conduit, one has a direct measure of viscosity.

A spring O connected to lever $h$ serves as a valve spring to damp the occurring oscillations.

Whereas in Fig. 2 the pistons or diaphragms $d$ and $e$ are located side by side on the lower side of the conduit, one of these measuring points may as well be located above and the other below, as seen from Fig. 3. In Fig. 3 the membrane $d$ is located above, immediately adjoining the connecting point of the manometer $n$, whereas the membrane $e$ is located below and connected to the restriction $b$. In such location, the positions of the membranes $d$ and $e$ do not interfere with one another and they can be enlarged at will, as called for by Equation (11). The pivoting point 9 of lever $h$ is in this case located on the right side of the whole contrivance and the lever arms $l_1$ and $l_2$, at variance with Fig. 2 are not positioned on opposite sides, but on the same side of the pivoting point $g$, whereas the pressures $$\frac{P_1}{2}$$

and $P_2$ act in opposite directions. In this way there results the same turning moment as in Fig. 2.

The above formulas were derived under the surmise, that in the portions of the conduit from 1 to 2 and from 2 to 3 respectively there exists the same amount of friction.

If, however, generally the friction in portion 1 to 2 of the conduit is surmised to be $\frac{l}{x}$ of the total friction in the portion 1 to 3 of the conduit, Equation (6) takes the broader form:

(6a) $\quad C_{1,3} = n \times C_{1,2}$

With regard to this generalized equation it follows by calculations, which correspond exactly to the calculations above given, that $$\frac{P_1}{n} - P_2$$

is independent of viscosity and a mere function of velocity. Accordingly constant speed of flow can be maintained by keeping constant the pressure difference between a fixed part $$\frac{P_1}{k}$$

of the pressure $P_1$ in the conduit ahead of the restricted portion $b$ and the total pressure $P_2$ in the restricted portion $b$. Herein $n$ stands for the ratio of the total friction in the conduit portion 1 to 3 to the partial friction in the conduit portion 1 to 2.

Having thus described our invention, what we claim is:

1. The method of measuring the viscosity of a liquid flowing in a conduit, which comprises maintaining a predetermined pressure difference between two fixed points in the conduit, controlling the speed flow of the liquid through the conduit by said pressure difference, passing the liquid flowing through a restricted passage in the conduit, and producing indications of variations in pressure through the conduit due to said flow, whereby to indicate upon a calibrated gage measurements of viscosity.

2. The method of measuring the viscosity of a liquid flowing through a conduit, which comprises passing the liquid through a restricted passage mounted in said conduit, maintaining a constant pressure difference between a point in said passage and another point in said conduit, and producing indications of pressure changes resulting from said flow of the liquid through the said passage, whereby to indicate measurements of viscosity upon a gage calibrated in units of viscosity.

3. The method of measuring the viscosity of a liquid flowing through a conduit, which comprises passing the liquid through a restricted passage mounted in said conduit, maintaining a constant pressure difference between a point in said passage and another point in said conduit, regulating the speed of flow through said pressure difference, and producing indications of pressure changes resulting from said flow of the liquid through the said passage, whereby to indicate measurements of viscosity upon a gage calibrated in units of viscosity.

4. An apparatus for measuring the viscosity of a liquid which comprises in combination, a conduit having a restricted passage mounted therein, a valve to control the flow to said conduit, a first pressure responsive device, a second pressure responsive device, both said devices being constructed and arranged to produce a movement corresponding to a differential pressure, means operable by said movement to actuate said valve, and a third pressure responsive device mounted in advance of said passage and calibrated in viscosity units.

5. An apparatus for measuring the viscosity of a liquid which comprises in combination, a conduit having a restricted passage mounted therein, a valve to control the flow to said conduit, a first pressure responsive device, a second pressure responsive device, both said devices being constructed and arranged to produce a movement corresponding to a predetermined differential pressure, means operable by said movement to actuate said valve, and a third pressure responsive device mounted in advance of said passage and calibrated in viscosity units.

6. An apparatus for measuring the viscosity of a liquid which comprises in combination, a conduit having a restricted passage mounted therein, a valve to control the flow to said conduit, a pivoted link connected to said valve, means operable by a pressure difference between two points in said passage to actuate said link, whereby to operate said valve, and means to indicate the pressure before the said passage.

7. An apparatus for measuring the viscosity of a liquid which comprises in combination, a conduit having a restricted passage mounted therein, a valve to control the flow to said conduit, means operable by a predetermined pressure difference to actuate said valve whereby to maintain constant the flow of liquid through the said passage, and means to indicate pressure changes before said passage and resulting from the flow liquid therethrough.

8. An apparatus for measuring the viscosity of a liquid which comprises in combination, a conduit having a restricted passage mounted therein, a valve to control the flow to said conduit, means to actuate said valve, said means being constructed and arranged to hold said valve in a fixed position corresponding to a predetermined pressure difference between two fixed points in the conduit and to alter the position of said valve momentarily when said pressure difference changes and until said difference resumes its aforesaid predetermined value, whereby to maintain constant the speed of flow of liquid through the conduit, and means to indicate pressure changes before said passage, said last mentioned pressure changes being due to variations in viscosity of the liquid flowing.

9. An apparatus for measuring the viscosity of a liquid which comprises in combination, a conduit having a restricted passage mounted therein, a valve to control the flow to said conduit, means to actuate said valve in accordance with changes in a predetermined pressure difference between two fixed points in said conduit, whereby to maintain constant the speed of flow of liquid through the conduit, and means to indicate pressure changes before said passage, said last mentioned pressure changes being due to variations in viscosity of the liquid flowing.

10. An apparatus for measuring the viscosity of a liquid which comprises in combination, a conduit having a restricted passage mounted therein, means to control the flow of liquid to said conduit, a first pressure responsive device, connected to said conduit, a second pressure responsive device, both said devices being constructed and arranged to produce a movement corresponding to a differential pressure, means operable by said movement to actuate said controlling means, and a third pressure responsive device associated with said passage, whereby to indicate pressure changes therein.

11. An apparatus for measuring the viscosity of a liquid which comprises in combination, a conduit having a restricted passage mounted therein, means to control the flow of liquid to said conduit, a first pressure responsive device connected to said conduit, a second pressure responsive device, both said devices being constructed and arranged to produce a movement corresponding to a differential pressure, means operable by said movement to actuate said controlling means, and a third pressure responsive device for measuring pressure changes within said passage.

12. The method of measuring the viscosity of a liquid flowing in a conduit which comprises, controlling the pressure difference between two fixed points in the conduit, whereby to control the speed of the liquid through the conduit by said pressure difference, passing the liquid flowing through a restricted passage of the conduit, and producing indications of variations in pressure through the conduit due to said flow, whereby to indicate upon a calibrated gauge measurements of viscosity.

13. The method of measuring the viscosity of a liquid flowing in a conduit which comprises, controlling the pressure difference between two fixed points in the conduit, whereby to control the admission of liquid to the conduit by said pressure difference, passing the liquid flowing through a restricted passage of the conduit, and producing indications of variations in pressure through the conduit due to said flow, whereby to indicate upon a calibrated gauge measurements of viscosity.

14. An apparatus for measuring the viscosity of a liquid which comprises in combination, a conduit having a restricted passage mounted therein, a valve to control the flow of liquid to said conduit, elastic means to actuate said valve in accordance with changes in the predetermined pressure difference between two fixed points of said conduit, whereby to maintain constant the speed of flow of liquid through the conduit, and means to indicate pressure changes before said passage, said last mentioned pressure changes being due to variations in viscosity of the liquid flowing.

15. An apparatus for measuring the viscosity of a liquid which comprises in combination, a conduit having a restricted passage mounted therein, a valve to control the flow of liquid to said conduit, an elastic diaphragm to actuate said valve in accordance with changes in the predetermined pressure difference between two fixed points of said conduit, whereby to maintain constant the speed of flow of liquid through the conduit, and means to indicate pressure changes before said passage, said last mentioned pressure changes being due to variations in viscosity of the liquid flowing.

16. An apparatus for measuring the viscosity of a liquid which comprises in combination, a conduit having a restricted passage mounted therein, a valve to control the flow of liquid to said conduit, a first elastic diaphragm, a second elastic diaphragm, both said diaphragms being constructed and arranged to produce a movement of said valve corresponding to a predetermined differential pressure, and a gauge mounted in advance of said restricted passage and calibrated in viscosity units.

17. In a viscosity meter having a restricted passage to which the liquid to be tested is conducted at a constant speed and in which the reaction of the flow of said liquid through said passage is indicated upon a pressure responsive device calibrated to indicate viscosity, means to control said speed, said means comprising in combination, a first elastic means movable in accordance with the pressure at one point in said meter, a second elastic means movable in accordance with the pressure at another point, link means to produce a differential movement of the movements of said two elastic means, and a valve connected to said link means and operable thereby.

WALTER J. ALBERSHEIM.
HARVEY S. KONHEIM.